(12) United States Patent
Rikkinen et al.

(10) Patent No.: US 9,496,919 B2
(45) Date of Patent: Nov. 15, 2016

(54) MOBILE COMMUNICATION NETWORKS

(71) Applicant: Broadcom Corporation, Irvine, CA (US)

(72) Inventors: Kari Rikkinen, Ii (FI); Sami-Jukka Hakola, Kempele (FI); Samuli Turtinen, Ii (FI); Timo Koskela, Oulu (FI); Anna Pantelidou, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 191 days.

(21) Appl. No.: 14/374,575

(22) PCT Filed: Jan. 25, 2013

(86) PCT No.: PCT/IB2013/050653
§ 371 (c)(1),
(2) Date: Jul. 25, 2014

(87) PCT Pub. No.: WO2013/111103
PCT Pub. Date: Aug. 1, 2013

(65) Prior Publication Data
US 2015/0043456 A1   Feb. 12, 2015

(30) Foreign Application Priority Data

Jan. 27, 2012  (GB) .................................. 1201419.7

(51) Int. Cl.
*H04B 1/7143* (2011.01)
*H04W 16/14* (2009.01)
(52) U.S. Cl.
CPC ........... *H04B 1/7143* (2013.01); *H04W 16/14* (2013.01)
(58) Field of Classification Search
CPC ...... H04B 1/7143; H04B 1/69; H04B 1/713; H04L 5/0012; H04W 16/14; H04W 72/0453
See application file for complete search history.

(56) References Cited

U.S. PATENT DOCUMENTS

| | | | |
|---|---|---|---|
| 2008/0144493 A1* | 6/2008 | Yeh ....................... | H04W 52/50 370/230 |
| 2009/0016293 A1* | 1/2009 | Kang .................. | H04W 72/085 370/329 |
| 2009/0073922 A1* | 3/2009 | Malladi ................. | H04L 1/0004 370/328 |
| 2009/0196249 A1 | 8/2009 | Kawamura et al. | |
| 2009/0209265 A1 | 8/2009 | Kwon et al. | |
| 2010/0135273 A1* | 6/2010 | Kim ........................ | H04B 1/69 370/344 |
| 2011/0188585 A1* | 8/2011 | Miki ....................... | H04L 5/001 375/259 |

FOREIGN PATENT DOCUMENTS

| | | | | |
|---|---|---|---|---|
| WO | 2010054693 | | 5/2010 | |
| WO | WO 2010054693 A1 | * | 5/2010 | ............ H04W 72/04 |

* cited by examiner

*Primary Examiner* — Scott M Sciacca
(74) *Attorney, Agent, or Firm* — Oblon, McClelland, Maier & Neustadt, L.L.P.

(57) ABSTRACT

A wireless communications method comprises: acquiring, by a radio apparatus, information indicating a frequency hopping pattern for control data in order to perform communication of the control data on at least one frequency resource unit hopping in frequency, wherein the frequency hopping pattern defines a control data band within the shared spectrum; acquiring knowledge of a user data band defined as a function of the control data band according to a predetermined criterion in order to per-form communication of user data on at least one free frequency resource unit within the user data band, wherein the user data band is within the shared spectrum and at least partly overlapping with the control data band; acquiring knowledge of a total frequency band comprising the control data band and the user data band; and causing communication of both the control data and the user data on the total frequency band.

20 Claims, 5 Drawing Sheets

MOBILE COMMUNICATION NETWORKS

TECHNICAL FIELD

The invention relates generally to mobile communication networks. More particularly, although not exclusively, the invention relates to communication of data and control channel on shared bands.

BACKGROUND

The demand for data rates and quality of service (QoS) is increasing in wireless communication. In order to reach these demands, radio communication networks, such as the Long Term Evolution (LTE) or the LTE-Advanced (LTE-A) of the $3^{rd}$ Generation Partnership Project (3GPP) seek for additional frequency bands for the radio communication. This may drive network operators to offload their traffic via local nodes providing local access to the Internet which may prevent congestion of the operators' own core network. However, this approach to improving the communication efficiency may not be sufficient to support the predicted data traffic. Another option proposed is to utilize unlicensed spectrum along with costly licensed spectrum. The unlicensed, license exempt or license-free spectrum may also be called a 'shared spectrum' or 'shared band'. Interesting shared band opportunities may comprise e.g. the industrial, scientific and medical (ISM) bands and TV white spaces. However the use of these unlicensed bands may be cumbersome due to regulations and because interference with other systems utilizing the shared band must be controlled, for example.

SUMMARY

Embodiments of the invention seek to improve the efficiency of data communications on a shared spectrum.

According to an aspect of the invention, there is provided a method of allocating frequency resources on a shared spectrum utilized by a plurality of communication systems, comprising: acquiring, by a radio apparatus, information indicating a frequency hopping pattern for control data in order to perform communication of the control data on at least one frequency resource unit hopping in frequency, wherein the frequency hopping pattern defines a control data band within the shared spectrum; acquiring knowledge of a user data band defined as a function of the control data band according to a predetermined criterion in order to perform communication of user data on at least one free frequency resource unit within the user data band, wherein the user data band is within the shared spectrum and at least partly overlapping with the control data band; acquiring knowledge of a total frequency band comprising the control data band and the user data band; and causing communication of both the control data and the user data on the total frequency band.

According to an aspect of the invention, there is provided an apparatus comprising means configured to cause the apparatus to perform the foregoing method.

According to an aspect of the invention, there is provided a computer program product embodied on a distribution medium readable by a computer and comprising program instructions which, when loaded into an apparatus, execute the foregoing method.

According to an aspect of the invention, there is provided an apparatus for allocating frequency resources on a shared spectrum utilized by a plurality of communication systems, the apparatus comprising: means to acquire information indicating a frequency hopping pattern for control data in order to perform communication of the control data on at least one frequency resource unit hopping in frequency, wherein the frequency hopping pattern defines a control data band within the shared spectrum; means to acquire knowledge of a user data band defined as a function of the control data band according to a predetermined criterion in order to perform communication of user data on at least one free frequency resource unit within the user data band, wherein the user data band is within the shared spectrum and at least partly overlapping with the control data band; means to acquire knowledge of a total frequency band comprising the control data band and the user data band; and means to cause communication of both the control data and the user data on the total frequency band.

Other aspects and embodiments of the invention will become apparent from the following description, drawings and claims.

BRIEF DESCRIPTION OF THE DRAWINGS

In the following, the invention will be described in greater detail with reference to the exemplary embodiments and the accompanying drawings, in which.

DETAILED DESCRIPTION

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
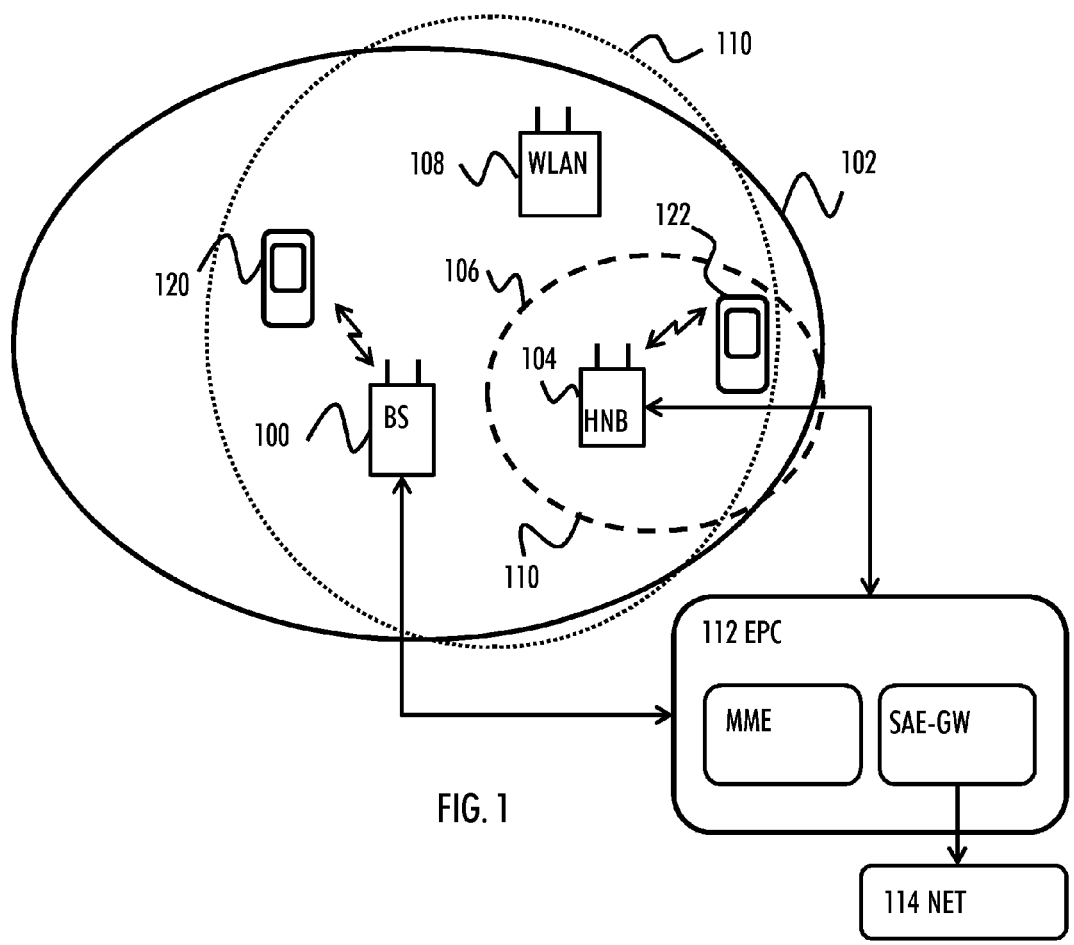
FIG. 1 is a schematic diagram that presents example communication networks.

FIG. 1 shows an example communication network applicable to embodiments of the invention. The communication network of FIG. 1 may comprise a base station 100 providing radio coverage to a cell 102 shown with solid circle and handling radio resource allocation for the cell 102. In general, the base station 100 applicable to the embodiments may be configured to provide communication services according to at least one of the following radio access technologies (RATs): Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. The present embodiments are not, however, limited to these protocols.

The base station may be node B (NB) as in the UMTS/HSPA, evolved node B (eNB) as in the LTE/LTE-A, a radio network controller (RNC) as in the UMTS, a base station controller (BSC) as in the GSM/GERAN, or any other apparatus capable of controlling radio communication and managing radio resources within the cell. For the sake of simplicity, let us assume that the base station 100 is an eNB. The development of the evolved universal mobile telecommunication's system (UMTS) terrestrial radio access network (E-UTRAN), which is the air interface of the LTE, is concentrated on the eNB 100. All radio functionality is terminated here so that the eNB 100 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE. The eNB 100 may be further connected via an S1 interface to an evolved packet core (EPC) 112, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, E-UTRAN idle mode packet buffering, a connection to Internet 114 etc.

At least partly overlapping with the cell 102 there may be a local area base station or Home eNB (HeNB) 104 with a coverage area 106 shown with a dashed circle. In this example, both the HeNB 104 and the eNB 100 may be connected to the SAE Gateway and the MME.

In the example of FIG. 1, a user equipment (UE) 122 is camped on the hNB 104, whereas a UE 120 is camped on the eNB 100. Furthermore, a wireless local area (WLAN) base station 108 may be transmitting with a coverage area 110 shown with a dotted circle. The term user equipment (UE) refers to a portable computing device. Such computing devices include wireless mobile communication devices operating with or without a subscriber identification module (SIM), including, but not limited to, the following types of terminal devices: mobile phone, user terminal (UT), smartphone, personal digital assistant (PDA), handset, laptop computer.

In an embodiment, at least some of the above connections between eNB's 100 and 104 and UEs utilise an unlicensed or shared spectrum which may be the same as the spectrum used by the WLAN base station 108 or by some other apparatus utilizing ISM spectrum. Thus, it may be that multiple systems may be allocated to share a common frequency band or spectrum which is shared in a dynamic manner between different systems. There may be a primary user system which has a priority access to the shared spectrum. For example, the WLAN users may be seen as the primary users whereas the cellular users may be so called secondary users. The secondary user may not be allowed to impose severe interference to the primary users. Alternatively, no system is given priority to the spectrum usage.

Attractive solutions on shared bands may comprise a controlled licensed spectrum which is primarily used by a licensed, primary system, as described above. Also standalone LTE-A femto cells, such the network controlled by the HeNB 104 of FIG. 1, providing fast access to the internet in a similar manner as the IEEE 802.11 specified WLAN, is an interesting option to facilitate in meeting the traffic demands. However, LTE's flexibility to manage deployment band, fast scheduling of multiple users both in time and frequency domain, dynamically adjustable number of active carriers and even flexible reconfiguration of center frequency offer tempting possibilities over the IEEE 802.11 standards. Thus, from the cellular traffic point of view, an interesting shared spectrum band opportunity is Industrial, Scientific and Medical (ISM) bands or TV white spaces. The ISM bands are widely used for WLAN and Bluetooth® communication, for example. The ISM bands allow both standardized systems and proprietary solutions to be deployed onto spectrum as far as regulations are followed. The shared spectrum may thus be the ISM band on 2.4 or 5 GHz, for example. The regulations define maximum transmission powers and certain rules for systems for the operation on the band.

Figure 2:
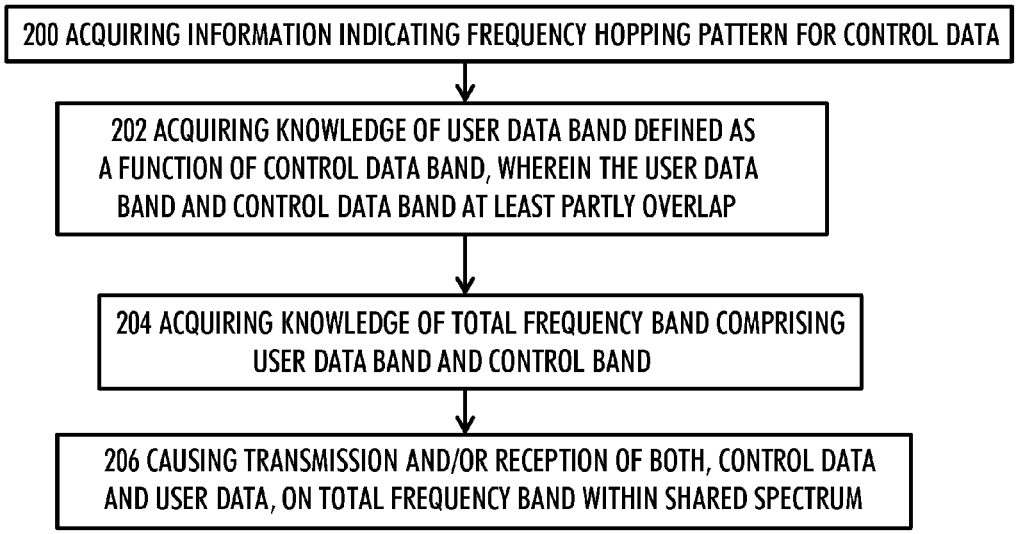
FIGS. 2 to 4 are flow diagrams that illustrate methods according to some embodiments.

In order to improve the efficiency of communication on the shared spectrum, it is proposed, as shown in step 200 of FIG. 2, to acquire, by a radio apparatus, such as the eNB 100 or the UE 120 for example, information indicating a frequency hopping pattern for control data. The hopping pattern may enable performing communication of the control data on at least one frequency resource unit, which is hopping in frequency. Therefore, the control channel (control data) transmission on downlink and uplink utilize a hopping of frequency blocks. The hopping pattern may be a predefined pattern or one of a set of predefined hopping patterns. In general, the hopping patterns are defined by a base station or eNB 100 or another network element of a communication system. When a UE is switched on it searches for control channels transmission of an eNB 100. When the UE finds a control channel transmitted by an eNB 100 it may obtain information of the hopping pattern from the eNB 100. Let us assume that an embodiment is applied to LTE based system. Let us further assume that the hopping pattern defines a pair-wise hopping of frequency blocks. There, the band of each of the two frequency blocks where the control channels are mapped to may be three PRBs each. Three PRBs equal 504 KHz and, thus, by combining two pieces, a virtual 6 PRB frequency chunk is obtained from which a receiver may construct a signal having a 1.08 MHz band. Thus it may be possible to reuse the LTE channels in their current format mapped in a discontinuous way onto subcarriers in frequency domain.

Moreover, the frequency hopping pattern defines a control data band (band) within the shared spectrum. Thus, the largest separation between any two hops in the hopping pattern may define the control data band (also known as a hopping band) within which the frequency hops take place. Using the pair-wise hopping for the control channels and having hopping intervals of 1 ms (1 sub frame comprising two 0.5 ms slots) allows a slot based hopping for PUCCH similar to current LTE based systems. It is to be noted also that the hopping band is within the shared band, i.e. the cellular system may at least occasionally be sharing the hopping band with another system. However, regulations of the shared band allow the use of the shared band in a time continuous manner when applying the frequency hopping approach.

As indicated, looking from the eNB 100 point of view, the acquiring of the hopping pattern may be performed by receiving data from a network element or by defining the hopping pattern from a predefined hopping pattern according to known cell identification, for example. Looking from the user terminal (user equipment) point of view, the acquiring of the hopping pattern may be performed by receiving data from the eNB 100, for example.

It is further proposed in step 202 to acquire knowledge of a user data band defined as a function of the control data band according to a predetermined criterion. This may be in order to perform communication of user data on at least one free frequency resource unit within the user data band. It is to be noted that the defined user data band is also within the shared spectrum. In particular, the user data band is at least partly overlapping with the control data band. This may allow for more efficient usage of the shared spectrum and for more efficient radio communication in general.

The user data is thus transmitted and/or received on the free frequency resource units comprised in the user data band. The term 'free' implies that the transmitting unit, such as the eNB or the UE, may first need to sense the user data band in order to detect whether or not there are any frequency resource units in the user data band which are not occupied, for example, by another system. Therefore, a listen-before-talk (LBT) or channel contention between the devices is applied when communicating user data on the shared spectrum in order to reduce interference. The LBT or channel contention may require a device to listen, monitor or measure, i.e. sense, the usage of a channel for a given time before making the decision whether to transmit on the channel or not. In an embodiment, the device may monitor energy level on a channel and if the level is above a given threshold it may determine that the channel is in use by another device. If the channel or spectrum is used by another device the transmitter is configured to abstain from transmitting or select a different channel. However, upon detecting at least a predetermined number of free frequency resource units, these free frequency resource units may then be applied for transmission of the user data to the receiver. The predetermined number of free frequency resource units depends on the amount of user data to be transmitted, for example. Thus, the user data transmission applies the LBT approach.

Figure 3:
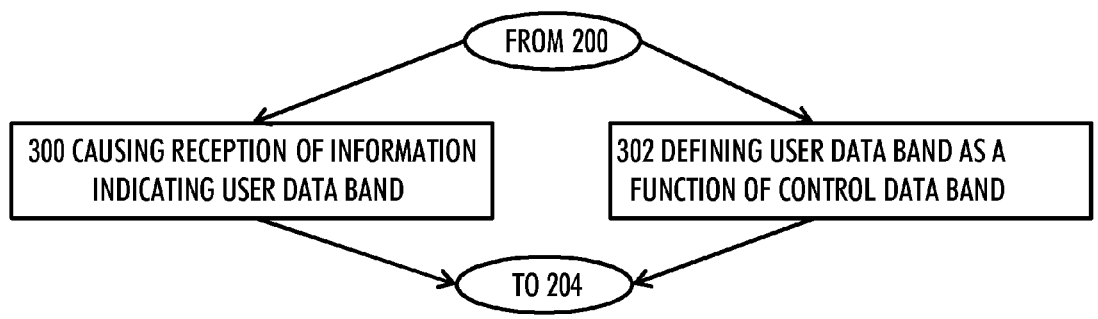

Acquiring knowledge of the user data band may be performed, as shown in step 300 of FIG. 3, by receiving information indicating the user data band from a network element or, in case of user terminal, from the eNB 102. Alternatively, as shown in step 302 of FIG. 3, the eNB 100 or the UE 120 may define the user data band as a function of the control data band according to a predetermined rule.

Figure 4:
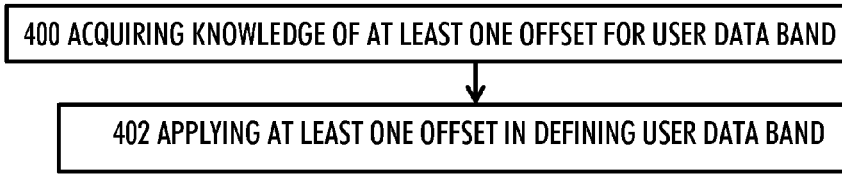

Let us assume that the eNB 100 defines the user data band. For this the eNB 100 may, as shown in step 400 of FIG. 4, acquire knowledge of an offset indicating how many frequency resource units are added to or removed from both edges of the control data band. The eNB 100 may either receive such information from a network element or define the offset itself. Consequently, the offset may be applied in defining the user data band as a function of the control data band by the eNB 100. FIG. 4 is valid also from the UE 120 point of view. The UE 120 may receive the offset from the eNB 102 and then in step 402 apply the offset in determining the user data band with respect to the control data band. System information transmitted in the control resources from the eNB 100 to the UE 120 may carry the offset to indicate the effective data channel band (i.e. user data band) relative to the control channel band (i.e. control data band). In case of one offset, the value may indicate the equal amount of frequency resource units in both edges the data channel band is narrower/wider than the control channel band. Alternatively, the UE may be informed of the user data band directly. However the former option may be more efficient in terms of information transfer between the eNB 100 and the UE 120.

Figure 5:
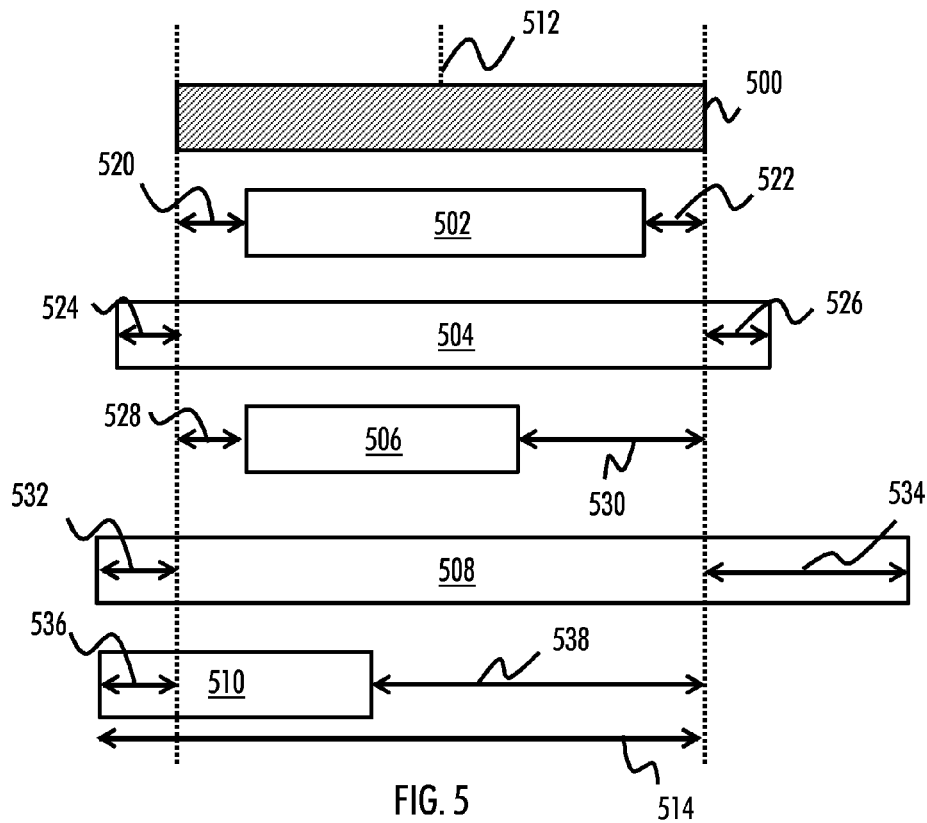
FIG. 5 is a schematic diagram that shows example user data bands as functions of a control data band, according to some embodiments.

Illustration of a user data band defined in the above described manner is shown in FIG. 5 with blocks 502 and 504. The control data band block 500 is marked with right leaning diagonal lines. Dotted vertical lines show the alignment of the control data band 500 throughout the FIG. 5 for clarity purposes. An example user data band 502 is narrower than the control data band as shown with double arrows 520 and 522 on both sides of user data band block 502. However, another example user data band block 504 is wider than the control data band block as shown with double arrows 524 and 526 on both sides of user data band block 504. Thus, in this case the offset has indicated a need to add a few resources to both edges of the control data band 500 in order to obtain the balanced user data band 504 with respect to the center frequency 512 of the control data band block 500.

FIG. 4 step 400 comprises an embodiment, in which the eNB 100 or the UE 120 acquires knowledge of two offsets for defining the user data band. Again, the acquiring of knowledge may be either by reception of information (by eNB 100 or by the UE 120) or by determining the offsets (by the eNB 100). One offset of the two offsets indicates how many frequency resource units are added to or removed from one edge of the control data band. The other offset of the two offsets indicates how many frequency resource units are added to or removed from the other edge of the control data band. Thereafter, the eNB 100, for example, may apply the two offsets in step 402 in defining the user data band as a function of the control data band, thus resulting in an unbalanced user data band with respect to the center frequency of the control data band.

Looking at FIG. 5, example user data band blocks 506, 508 and 510 are obtained by using two offsets as described above. For example, a block representing the user data band 506 (i.e. user data band block 506), may be obtained by deducting a certain number of frequency resource units represented by an arrow 528 from one edge, or end, of the control data band 500 and by deducting a certain number of frequency resource units represented by an arrow 530 from the other edge of the control data band 500. Similarly the user data band may be defined to be wider than the control data band 500 as shown with block 506 and arrows 532 and 534. As a further example, the block 510 may be defined so that a certain number of frequency resource units represented by an arrow 536 are added to one edge of the control data band 500 and a certain number of frequency resource units represented by an arrow 538 are deducted from the other edge of the control data band 500.

Thus, the aforementioned offsets could be both negative and positive to allow wider data channel frequency resources than control channel resources. Having narrower user data band than the control data band 500, as represented at least by block 502 and 506, may allow for the control data hopping system to utilize a certain amount of non-overlapping frequency resources when the system is having low load and, thus, there may be no need for wider band data resources. In other words, the system may advantageously adapt to the current communication needs in real time by redefining the user data band 502 to 510, for example.

Figure 6:
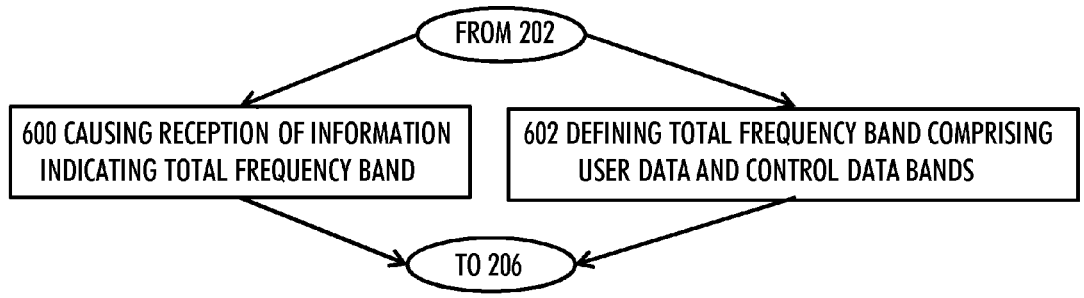
FIG. 6 is a flow diagram that shows a method according to an embodiment.

Referring back to FIG. 2, in step 204, it is proposed that the eNB 100 or the UE 120 acquires knowledge of a total frequency band comprising the control data band and the user data band. The acquiring may take place as shown in step 600 of FIG. 6 by causing reception of information indicating the total frequency band from a network element or from the eNB 100, for example. Alternatively, as shown in step 602 of FIG. 6, the eNB 100 or the UE 120 may itself define the total frequency band so that it comprises the user data band and the control data band. In an embodiment, the total frequency band may be defined as the minimum band which comprises both of the control data band and the user data band. In one example, the total frequency band is the larger of the control data band and the user data band. In one example, where the control data band 500 is larger than the user data band, the total frequency band is defined by the control data band. However, it may be that neither of the two bands fully overlap with the other one, as is the case with the control data band 500 and the user data band 510 of FIG. 5. In this case the total frequency band may be as shown with an arrow 514 in FIG. 5.

In step 206 of FIG. 2 it is then proposed to cause communication of both the control data and the user data on the total frequency band. That is, the control data and the user data are both transmitted and/or received on the frequency resource units of the total frequency band within the shared spectrum. This may be obtained by multiplexing the control data and the user data on the same total frequency band and by transmitting the control data and the user data within a same transmission time interval in a time domain. For the control data, continuous time domain transmission/reception may take place whereas, for the user data, the transmitting apparatus needs to sense the user data band in order to detect free frequency resource units not occupied by, for example, control data or by another system utilizing the shared band (within which the total frequency band is). Let us look at this closer by referring to FIG. 7.

Figure 7:
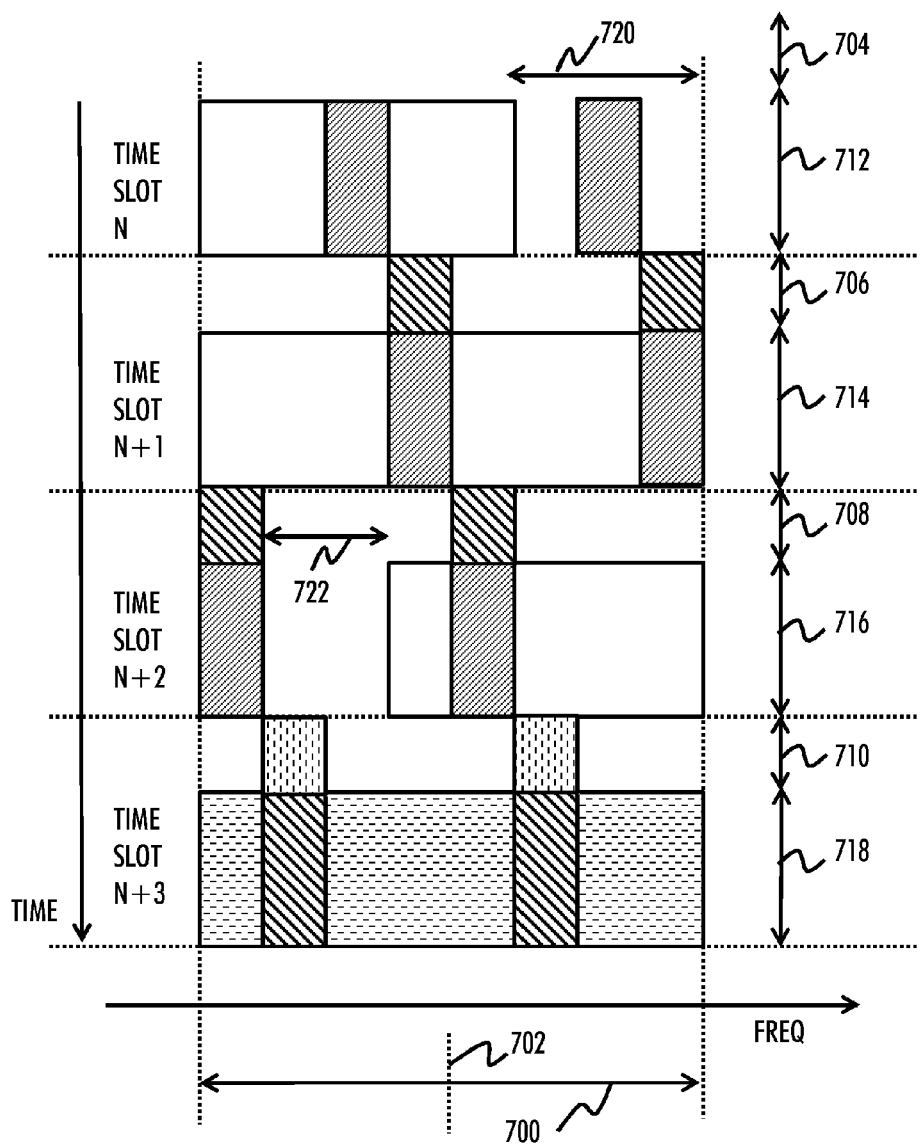
FIG. 7 is a frequency against time graph that illustrates an example data communication according to an embodiment.

FIG. 7 illustrates an example of the shared spectrum within which the total frequency band 700 is. In the figure, time runs from top to bottom. In the example of FIG. 7, the control data band equals and fully overlaps with the user data band. In other words, the total frequency band 700 may be seen also as the control data band and as the user data band. The center frequency of the total frequency band is depicted with reference numeral 702 which simultaneously is the center frequency for the control data band and for the user data band in this example. For simplicity, FIG. 7 illustrates the spectrum as one continuous block. The hopping pattern shown in FIG. 7 is for illustrative purposes only.

FIG. 7 shows four successive transmission time intervals (TTIs) N, N+1, N+2, an N+3 separated with dotted horizontal lines. The transmission time intervals may be slots, frames or sub frames, for example. In an embodiment, each TTI comprises a user data channel (i.e. user data) slot comprising white blocks, corresponding to DL user data transmission, and blocks represented with horizontal dashes, corresponding to UL user data transmission. As shown, the transmission and/or reception of any user data takes place within the user data band 700 (a.k.a. user data bandwidth).

Additionally, each TTI may comprise a control channel (i.e. control data) slot. In the shown example, common and dedicated DL control channels are mapped to two pair-wise hopping frequency blocks shown with right leaning diagonal lines, whereas the control data to the UL is transmitted on the pair-wise hopping frequency blocks shown with left leaning diagonal lines or with vertical dashes, depending on the transmitting UE. As shown, the hops are within the control data band 700 (a.k.a. control data bandwidth). Thus, in each given control channel slot, the base station or eNB 100 may be configured to transmit on the DL part and/or UEs 120 in the UL part.

Even though the control channels are depicted in form of pairs, they may be implemented using only one continuous resource, or a different number of continuous resources in the downlink and in the uplink. Furthermore, the control channel time allocation in a slot does not need to be same as the data channel time allocation.

As can be seen from the figure, to multiplex the control and data part to the same total frequency band, a signal structure is created in which the control channels are mapped to hop in the frequency domain while the user data channels use opportunistically the other parts of the same total frequency spectrum 700. In other words, the user data may occupy opportunistically all time-frequency resource units within the total frequency band 700 which are not used by the control channels or by any other device/system during the current TTI.

For the transmission of the user data on a Physical Uplink shared Channel (PUSCH) and on a Physical Downlink Shared Channel (PDSCH), the transmitting apparatus may need to sense the user data band before the transmission. During a sensing period 704 to 710, a transmitter which intends to transmit on the following user data communication period is configured to sense traffic of the data channel and make a decision whether to transmit or not on the basis of the sensing, that is on the basis of whether or not free frequency resources are detected. Therefore, each TTI may be divided into the sensing period 704 to 710 and a data communication period 712 to 718, wherein during the data communication period both the control data and the user data may be transmitted on the total frequency band. In this example, the TTIs N, N+1, and N+2 comprise downlink data communication periods 712 to 716 during which the eNB 100 may transmit to one or more UEs. The TTI N+3 comprises an uplink data communication period 718 during which one or more UEs may transmit to base station(s). In case of the uplink TTI N+3, the available frequency resource may be divided between more than one UE. Each UE may sense only the frequency resource given to the UE.

Whereas the user data is transmitted by applying the LBT approach, all DL and UL control data may be transmitted in a frequency hopping way, for example continuously in time domain. Each control channel slot (i.e. when control data is transmitted) may comprise the DL part and the UL part, wherein the UL part occurs at the same time as the sensing period 704 to 710. The uplink part of the control channel slot can provide fixed feedback delay for downlink transmission (similar to LTE FDD) even in very downlink oriented downlink/uplink ratio in data transmission opportunities. This may allow for a reliable communication of synchronization signals, critical control channel signalling like HARQ (Hybrid automatic repeat request) feedback.

The control data may be transmitted on control channels including, in the DL part, Physical Broadcast Channel (PBCH), Physical Control Format Indicator Channel (PCFICH), Physical Downlink Control Channel (PDCCH), Physical HARQ Indicator Channel (PHICH), primary synchronization signal (PSS) and secondary synchronization signal (SSS). The downlink control channels are used by a base station for downlink scheduling commands, HARQ acknowledgements and uplink data transmission opportunity scheduling commands, for example. In the UL part, the uplink control channels may comprise a shortened PUCCH and/or a Random Access Channel (RACH). A shortened uplink control channel transmission part could be used for a shortened PUCCH and for a shortened RACH preamble, e.g. format 4 of the LTE time division duplex mode. The PUCCH may carry HARQ information, for example.

In an embodiment, the center frequency 702 may be indicated as a relative offset to frequency resource unit carrying predetermined information. The predetermined information may be the master information block (MIB) carried in the downlink control data part, for example. In particular, as the control channels are hopping in frequency including the primary and secondary synchronization channels (PSS and SSS) as well as the MIB, the aforementioned center frequency 702 may be indicated as a relative offset in MIB to the left edge of the frequency resource conveying the MIB in the physical broadcast channel (PBCH), wherein the left edge is presented as a nonlimiting example. The center frequency may be important for example when defining the user data band, as described with reference to FIGS. 4 and 5.

The order of the DL and UL parts may be reversed, if needed. To illustrate, in an embodiment, the uplink part of a control channel slot is in the beginning of the control channel slot. FIG. 7 illustrates this embodiment. For example, the TTI N+1 comprises a user data channel slot with a sensing period 706 and a data communication period 714. The control channel slot comprises an uplink part shown with left leaning diagonal lines and a downlink part shown with right leaning diagonal lines, wherein the uplink part occurs at the time as the sensing period 706.

In another embodiment (not shown), the uplink part of a control channel slot is in the end of the control channel slot and the transmission of the control channel slot starts at the end of the sensing period 706 of the TTI N+1. Therefore, the uplink part of the control channel slot occurs at the same time as the sensing period 708 of the next TTI N+2. Thus, the timing of control channel slot is delayed by the length of uplink part compared to start of the TTI. When the start of the user data channel slot is seen to be at the change of the TTI, it may be said that the user data channel slot timing is considered to be in advance of the control channel slot timing in this embodiment (not shown).

The eNB 100 may be configured to schedule uplink data transmission opportunities of the UEs. For example, the eNB 100 may schedule in the TTI N, a data uplink transmission opportunity to take place during the TTI N+3. Such UL scheduling may take place via DL control channels. The UEs assigned the transmission opportunity need to sense the user data band in the sensing period 710 and make a decision whether to transmit or not on the data communication period 718. The transmission of user data in uplink is shown with the blocks marked with horizontal dashes. As can be seen, the scheduled UE does not transmit user data when the UE transmits control data. However, otherwise the user data band is free to utilize. Furthermore, these UEs need to omit the uplink control channel transmission during the sensing period 710 due to sensing requirement at the same time. Other UEs not scheduled for UL transmission may transmit control data during the sensing period 710 as shown with resource unit blocks represented with vertical dashes. The UEs that needed to omit their feedback transmission linked to certain previous downlink transmission shall then multiplex feedback for two downlink timeslots (depends on previous downlink transmissions to that specific UE) into PUCCH of the timeslot of uplink transmission opportunity or into scheduled PUSCH resources if UE decides to use those resources after sensing operation. The former option may ensure transmission of the feedback.

In an embodiment, after the sensing operation, if downlink data is to be transmitted, the eNB 100 is configured to prepare downlink control channels by indicating by given Radio Network Temporary Identifier (RNTI) on the PDCCH that downlink opportunity is used in this time slot, select users to be scheduled and generate corresponding PDCCH. For example, referring to FIG. 7, the eNB 100 may detect that part of the user data band applicable for transmitting user data is occupied by another device on the shared spectrum. These occupied frequency resource units are shown with an arrow 720 for the TTI N and with an arrow 722 for the TTI N+2. Additionally, the eNB 102 may detect or know that user data may not be transmitted on the frequency resource units applied by the control data, i.e. occupied according to the hopping pattern. When the eNB 100 determines that no downlink data is to be transmitted (for example, due to lack of free resources), the process may continue by preparing downlink control channels by indicating in PCFICH that downlink opportunity is not used.

The transmission period of PSS, SSS and PBCH may be higher than PCFICH, PDCCH and PHICH transmission periods. The user data channel slot timing may be recovered from the detected PSS sequence during the initial synchronization. The synchronization signals are used by UEs searching for base stations to synchronize with a base station. After synchronization, UEs may obtain information regarding the base station from PBCH which is transmitted in the same downlink sub frame as the PSS and SSS transmissions to allow fast broadcast information detection after initial synchronization. In an embodiment, the UEs are configured to buffer the control channel data so the PBCH data may be obtained from the buffer after obtaining synchronization.

The UEs which are already connected to a base station need not listen to PSS or SSS. Thus, a guard period for providing transition time for the change of DL to UL or vice versa my not be needed between downlink and uplink parts of the control data slot. However, when the DL part of the control data does not comprise any synchronization signals, a guard period may be required between the downlink part and the uplink part in order to provide transition time for the change of DL to UL or vice versa.

Figure 8:
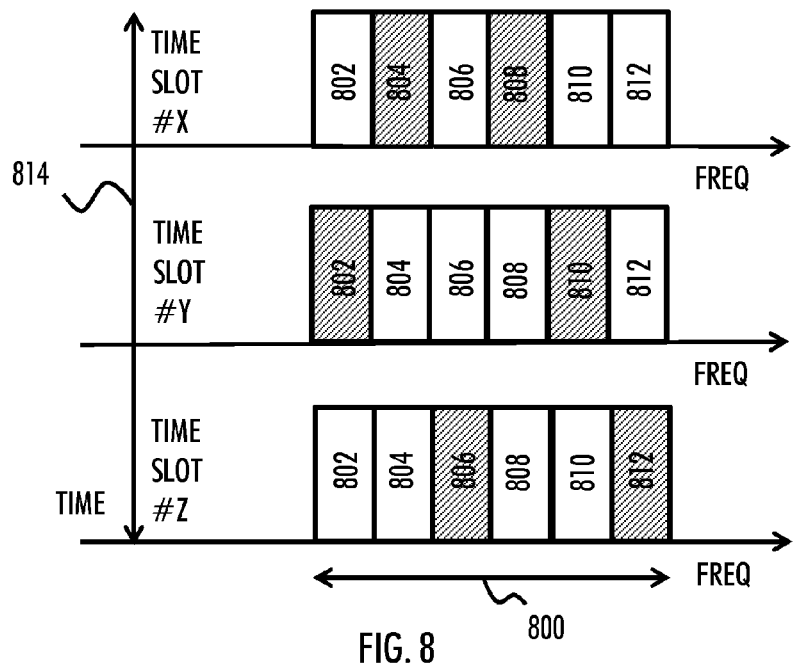
FIG. 8 is a frequency against time graph that illustrates how to obtain channel state information, according to an embodiment.

Via multiplexing of control data and user data channels into the same resources of the total frequency spectrum, as in FIG. 7, and due to hopping nature of the control channels with guaranteed channel access to the shared band, channel state information (CSI) may be estimated both by the eNB 100 and UE 120 from the reference signals conveyed in the control channel transmissions by the UE 120 and eNB 100, respectively. This may enable more efficient link adaptation in terms of modulation and coding schemes (MCS), for example, compared to earlier solutions. Therefore, in an embodiment, as shown in FIG. 8, the control data shown with right leaning diagonal lines may be transmitted and/or received at least once on each of the frequency resource units 802 to 812 of the defined control data band 800 during a channel coherence time 814. Further, it may be that the control data transmitted on the frequency resource units 802 to 812 carries a channel sounding signal in order to enable determination of channel condition, such as the channel state information (CSI), for the overlapping part of the user data band. In embodiment, as shown in FIG. 7, where the user data band and the control data band fully overlap, it may be appreciated by a skilled person that by transmitting the sounding signal in each frequency resource unit 802 to 814 of the control data band, CSI may be obtained in each and every frequency resource unit of the user data band.

To enable support for the CSI in the above manner, the hopping pattern and hops in frequency may be designed so that, within certain time period corresponding to channel coherence time, the control data channel covers the whole bandwidth of the control data band with the resolution corresponding to the channel coherence bandwidth. Alternatively, the eNB 100 may configure hops outside the hopping pattern to transmit/receive control data at least once on each of the frequency resource units 802 to 812 of the defined control data band 800 during a channel coherence time 814. The channel coherence time is the time period during which channel may be seen unchanged with respect to the CSI, whereas the channel coherence bandwidth is the bandwidth within which the channel may be seen unchanged with respect to the CSI. The channel coherence time in FIG. 8 may be seen to comprise at least the TTIs #X, Y and Z, which do not need to be adjacent to each other.

Figure 9:
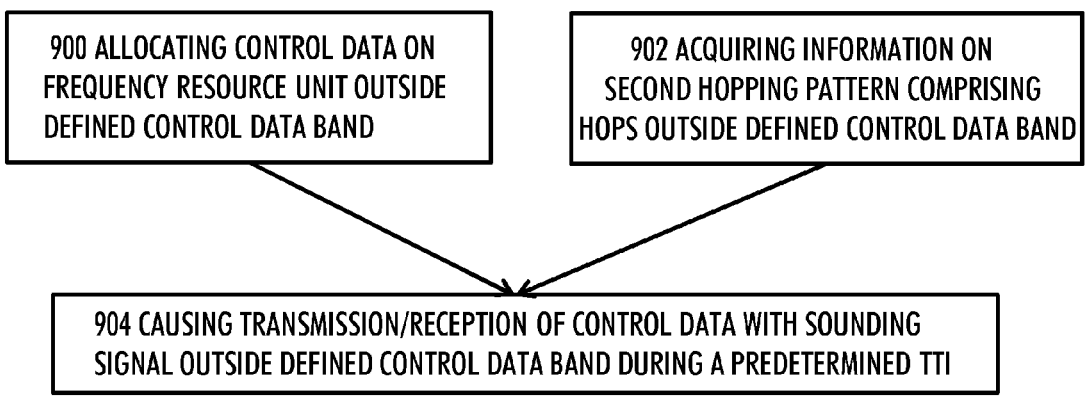
FIG. 9 is a flow diagram that shows a method according to an embodiment.
Figure 10:
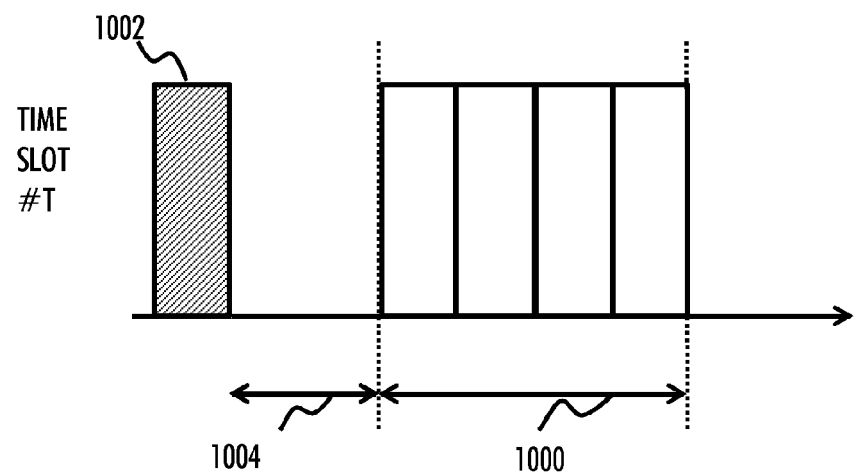
FIG. 10 is a frequency against time graph that illustrates how to obtain channel state information outside the control data band, according to an embodiment.

To provide means for frequency agility, it's proposed that in an embodiment as shown in FIGS. 9 and 10, the eNB 100 may allocate (configure) in step 900 control data on at least one frequency resource unit 1002 outside the defined control data band 1000 during the at least one predetermined transmission time interval #T. In other words, the eNB may configure certain transmission time intervals for the hopping control channels to hop outside the configured operating bandwidth 1000 in order to sound certain possible/candidate new resources. At one TTI, the separation 1004 from the control data band 1000 may be 1 MHz, at another TTI 2 MHz, at a third TTI 5 MHz, etc. In general, the selection of the allocated candidate frequency resource unit may be arbitrary within the shared band.

Thereafter, the eNB 100 or the UE 120 may in step 904 cause transmission and/or reception of control data outside the defined control data band 1000 during at least one predetermined transmission time interval #T in order to acquire channel condition, such as the CSI, outside the defined control data band 1000. In order to obtain the CSI, the control data transmitted on the frequency resource unit 1002 may carry a channel sounding signal.

As an alternative to the eNB 100 allocating the new candidate frequency resource units 1002 outside the defined control data band 1000, the eNB 100 or the UE 120 may in step 902 acquire information indicating at least one second hopping pattern, for example based on known cell identification. The second hopping pattern may not affect the definition of the control data band 1000 which is defined by the hops in the original (first) hopping pattern. However, the second hopping pattern may comprise hops outside the defined control data band 1000, such as at least the hop applying the resource unit 1002. Thereafter, the eNB 100 or the UE 120 may apply the second hopping pattern during the at least one predetermined TTI #T in order to acquire channel condition, such as the CSI, outside the defined control data band 1000. This allows the system to identify new frequency resources applicable to data communication within the shared band.

In an embodiment, wherein the time slot for uplink control data occurs at the same time as the sensing period for the free frequency resource units in the user data band, the UE 120 may restrain from transmitting any uplink control data during the sensing period in order to enable reducing the length of the sensing period. Omitting the uplink control channel transmissions during the sensing periods, may lead to more efficient data communication, for example. This is because then the sensing periods are not restricted to the length of the uplink control data transmissions. Another example use case for a short or omitted uplink control channel transmissions by UEs during the downlink timeslots may be to provide time periods for transmission of sounding signals on certain frequency resources 1002 outside the current control data bandwidth 1000 to find possible new communication resources.

Figure 11:
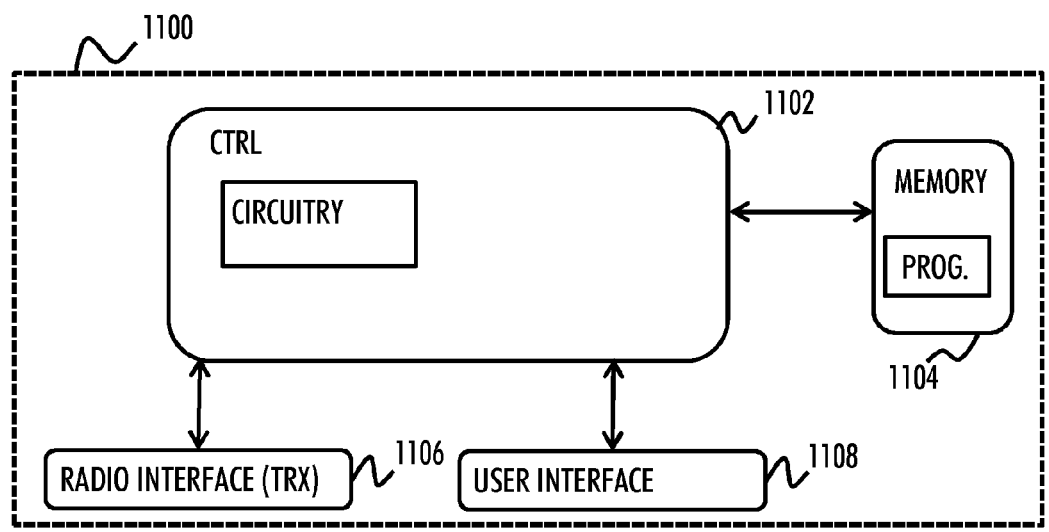
FIG. 11 is a schematic diagram that shows an apparatus according to an embodiment.

An embodiment, as shown in FIG. 11, provides an apparatus 1100 comprising at least one processor 1102 and at least one memory 1104 including a computer program code (PROG), wherein the at least one memory 1104 and the computer program code (PROG) are configured, with the at least one processor 1102, to cause the apparatus 1100 to carry out any one of the above-described processes with respect to FIGS. 1 to 11. It should be noted that FIG. 11 shows only the elements and functional entities required for understanding the apparatus 1100. Other components have been omitted for reasons of simplicity. The implementation of the elements and functional entities may vary from that shown in FIG. 11. The connections shown in FIG. 11 are logical connections, and the actual physical connections may be different. The connections can be direct or indirect and there can merely be a functional relationship between components. It is apparent to a person skilled in the art that the apparatus may also comprise other functions and structures.

As indicated, the apparatus 1100 may comprise the at least one processor 1102. The at least one processor 1102 may be implemented with a separate digital signal processor provided with suitable software embedded on a computer readable medium, or with a separate logic circuit, such as an application specific integrated circuit (ASIC). The at least one processor 1102 may comprise an interface, such as computer port, for providing communication capabilities.

The at least one processor 1102 may comprise at least one control circuitry for performing any of the embodiments described above. The memory may store software (PROG) executable by the at least one control circuitry of the at least one processor 1102. The at least one control circuitry may cause the apparatus 1100 to acquire knowledge of the hopping pattern, the control data band, the user data band at least partly overlapping with the control data band and the total frequency band, all within the shared band, such as within the ISM. The at least one control circuitry may also cause the apparatus 1100 to determine whether to transmit user data or not based on the sensing information by applying the LBT approach and to transmit the control data by applying the hopping pattern. The control circuitry or control circuitries may cause the apparatus to transmit and/or receive (i.e. perform communication) of control and user data on the total frequency band, in other words, to multiplex the control data and the user data to the same frequency band.

The apparatus 1100 may also comprise radio interface components 1106 providing the apparatus with radio communication capabilities with the radio access network. The radio interface components 1106 may comprise standard well-known components such as amplifier, filter, frequency-converter, (de)modulator, and encoder/decoder circuitries and one or more antennas.

The apparatus 1100 may also comprise a user interface 1108 comprising, for example, at least one keypad, a microphone, a touch display, a display, a speaker, etc. The user interface may be used to control the apparatus 1100 to the device attached to the apparatus 1100 by the user.

In an embodiment, the apparatus 1100 may be comprised in a base station (also called a base transceiver station, a Node B, a radio network controller, or an evolved Node B, for example). The apparatus 1100 may comprise a circuitry, e.g. a chip, a processor, a micro controller, or a combination of such circuitries in the base station and cause the base station to carry out the above-described functionalities.

In another embodiment, the apparatus 1100 may comprise the terminal device of a cellular communication system, e.g. a computer (PC), a laptop, a tabloid computer, a cellular phone, a communicator, a smart phone, a palm computer, or any other communication apparatus. In another embodiment, the apparatus is comprised in such a terminal device, e.g. the apparatus may comprise a circuitry, e.g. a chip, a processor, a micro controller, or a combination of such circuitries in the terminal device and cause the terminal device to carry out the above-described functionalities. Further, the apparatus 1100 may be or comprise a module (to be attached to the UE) providing connectivity, such as a plug-in unit, an "USB dongle", or any other kind of unit. The unit may be installed either inside the UE or attached to the UE with a connector or even wirelessly.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configure to carry out embodiments of any of the FIGS. 1 to 11. In an embodiment, the at least one processor 1002, the memory 1004, and the computer program code (PROG) form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method of allocating frequency resources on a shared spectrum utilized by a plurality of communication systems, the method comprising:
    acquiring, by circuitry of a radio apparatus, information indicating a frequency hopping pattern for control data in order to perform communication of the control data on at least one frequency resource unit hopping in frequency, wherein the frequency hopping pattern defines a control data band, comprising a plurality of frequency resource units, within the shared spectrum such that the control data occupies each of the frequency resource units at least once during a channel coherence time;
    acquiring information of a user data band defined as a function of the control data band according to a predetermined criterion in order to perform communication of user data on at least one free frequency resource unit within the user data band, wherein the user data band is within the shared spectrum and at least partly overlapping with the control data band;
    acquiring information of a total frequency band comprising the control data band and the user data band; and
    controlling, by the circuitry, communication of both the control data and the user data on the total frequency band.

2. The method of claim 1, further comprising:
    sensing the user data band to detect whether there are any frequency resource units in the user data band which are not occupied by either of: a primary system of the shared spectrum and the control data; and
    controlling transmission, upon detecting at least a predetermined number of free frequency resource units, of the user data on the free frequency resource units.

3. The method of claim 1, further comprising:
acquiring information of an offset indicating how many frequency resource units are added to or removed from both edges of the control data band; and
applying the offset in defining the user data band as a function of the control data band.

4. The method of claim 1, further comprising:
acquiring information of two offsets for defining the user data band, wherein a first offset indicates how many frequency resource units are added to or removed from one edge of the control data band and a second offset indicates how many frequency resource units are added to or removed from the other edge of the control data band; and
applying the two offsets in defining the user data band as a function of the control data band, resulting in an unbalanced user data band with respect to a center frequency of the control data band.

5. The method of claim 4, wherein the center frequency is defined as a relative offset to a frequency resource unit carrying predetermined information.

6. The method of claim 1, further comprising:
controlling transmission and/or reception of the control data at least once on each of the frequency resource units of the control data band during the channel coherence time, wherein
the control data carries a channel sounding signal in order to enable determination of a channel condition for the overlapping part of the user data band.

7. The method of claim 1, further comprising:
controlling transmission and/or reception of control data outside the defined control data band during at least one predetermined transmission time interval in order to acquire a channel condition outside the defined control data band, wherein the control data carries a channel sounding signal.

8. The method of claim 1, wherein a time slot for uplink control data occurs at a same time as a sensing period for the free frequency resource units in the user data band, and
the method further comprises omitting, by a user terminal, from transmitting any uplink control data during the sensing period in order to enable reducing the length of the sensing period.

9. An apparatus for allocating frequency resources on a shared spectrum utilized by a plurality of communication systems, the apparatus comprising:
circuitry configured to:
acquire information indicating a frequency hopping pattern for control data in order to perform communication of the control data on at least one frequency resource unit hopping in frequency, wherein the frequency hopping pattern defines a control data band, comprising a plurality of frequency resource units, within the shared spectrum such that the control data occupies each of the frequency resource units at least once during a channel coherence time;
acquire information of a user data band defined as a function of the control data band according to a predetermined criterion in order to perform communication of user data on at least one free frequency resource unit within the user data band, wherein the user data band is within the shared spectrum and at least partly overlapping with the control data band;
acquire information of a total frequency band comprising the control data band and the user data band; and
control communication of both the control data and the user data on the total frequency band.

10. The apparatus of claim 9, wherein the circuitry is further configured to:
sense the user data band to detect whether or not there are any frequency resource units in the user data band which are not occupied by either of the following: a primary system of the shared spectrum and the control data; and
control transmission, upon detecting at least a predetermined number of free frequency resource units, of the user data on the free frequency resource units.

11. The apparatus of claim 9, wherein the circuitry is further configured to:
acquire information of an offset indicating how many frequency resource units are added to or removed from both edges of the control data band, and
apply the offset in defining the user data band as a function of the control data band.

12. The apparatus of claim 9, wherein the circuitry is further configured to:
acquire information of two offsets for defining the user data band, wherein a first offset indicates how many frequency resource units are added to or removed from one edge of the control data band and a second offset indicates how many frequency resource units are added to or removed from the other edge of the control data band, and
apply the two offsets in defining the user data band as a function of the control data band, resulting in an unbalanced user data band with respect to a center frequency of the control data band.

13. The apparatus of claim 12, wherein the center frequency is defined as a relative offset to a frequency resource unit carrying predetermined information.

14. The apparatus of claim 9, wherein the circuitry is further configured to control transmission and/or reception of the control data at least once on each of the frequency resource units of the control data band during the channel coherence time, and
the control data carries a channel sounding signal in order to enable determination of a channel condition for the overlapping part of the user data band.

15. The apparatus of claim 9, wherein the circuitry is further configured to control transmission and/or reception of control data outside the defined control data band during at least one predetermined transmission time interval in order to acquire a channel condition outside the defined control data band, and
the control data carries a channel sounding signal.

16. The apparatus of claim 15, wherein the circuitry is further configured to allocate the control data on at least one frequency resource unit outside the defined control data band during the at least one predetermined transmission time interval.

17. The apparatus of claim 15, wherein the circuitry is further configured to:
acquire information indicating at least one second hopping pattern, wherein the second hopping pattern comprises hops outside the defined control data band; and
apply the second hopping pattern during the at least one predetermined transmission time interval in order to acquire a channel condition outside the defined control data band.

18. The apparatus of claim 9, wherein the control data band equals to and fully overlaps with the user data band.

19. The apparatus of claim 9, wherein
a time slot for uplink control data occurs at a same time as a sensing period for the free frequency resource units in the user data band, and
the circuitry is further configured to omit from controlling transmission of uplink control data during the sensing period in order to enable reducing the length of the sensing period.

20. A non-transitory computer readable memory storing computer executable instructions that, when executed by circuitry, cause the circuitry to:
acquire information indicating a frequency hopping pattern for control data in order to perform communication of the control data on at least one frequency resource unit hopping in frequency, wherein the frequency hopping pattern defines a control data band, comprising a plurality of frequency resource units, within the shared spectrum such that the control data occupies each of the frequency resource units at least once during a channel coherence time;
acquire information of a user data band defined as a function of the control data band according to a predetermined criterion in order to perform communication of user data on at least one free frequency resource unit within the user data band, wherein the user data band is within the shared spectrum and at least partly overlapping with the control data band;
acquire information of a total frequency band comprising the control data band and the user data band; and
control communication of both the control data and the user data on the total frequency band.

\* \* \* \* \*